(12) United States Patent
Snoeyen

(10) Patent No.: US 6,210,148 B1
(45) Date of Patent: Apr. 3, 2001

(54) INJECTION-MOULDING APPARATUS AND MOULD FOR USE IN THE INJECTION-MOULDING APPARATUS

(75) Inventor: Anthonius J. H. Snoeyen, Eindhoven (NL)

(73) Assignee: U.S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/067,198

(22) Filed: May 25, 1993

(30) Foreign Application Priority Data

Jul. 20, 1992 (EP) ................................................ 92202203

(51) Int. Cl.⁷ .................................................... B29C 45/40
(52) U.S. Cl. .......................... 425/554; 425/556; 425/574; 425/575; 425/810
(58) Field of Search ................................. 425/810, 554, 425/556, 574, 575

(56) References Cited

U.S. PATENT DOCUMENTS 4,085,178 * 4/1978 McNeely et al. ..................... 425/810
4,185,955   1/1980 Holmes et al. ....................... 425/542
5,209,889 * 5/1993 Brown et al. ......................... 425/575

* cited by examiner

Primary Examiner—Tim Heitbrink
(74) Attorney, Agent, or Firm—Ernestine C. Bartlett

(57) ABSTRACT

An injection-molding apparatus comprises a mold (3) having a first and a second mold section (5, 7). A bounding surface (13) of the second mold section (7) is in contact with a base (19) of the injection-molding apparatus. A movable punch (81) for severing a sprue slug from the product and an ejector for ejecting the sprue slug from the punch have been provided in the second mold section. The injection-molding apparatus further comprises an arrangement (93, 99) for moving the punch and the ejector. This arrangement is externally of the mold inside the base. As a result of this, the mold can be of compact construction and no connection lines for moving the punch and the ejector are required, so that the mold can be removed rapidly from the injection-molding apparatus. The punch (81) and the ejector (91) have been divided at the location of the bounding surface (113). This enables the second mold section (7) to be coupled rapidly to the base (19), as a result of which the second mold section can be exchanged rapidly with a further mold section.

6 Claims, 2 Drawing Sheets

INJECTION-MOULDING APPARATUS AND MOULD FOR USE IN THE INJECTION-MOULDING APPARATUS

FIELD OF THE INVENTION

The invention relates to an injection-moulding apparatus comprising a mould having a first and a second mould section, which mould sections are movable relative to one another between a first position, in which both mould sections are in contact with one another and define a cavity for moulding a product, and a second position, in which the mould sections are spaced apart to allow removal of the moulded product, the second mould section having a bounding surface at a side remote from the first mould section, with which bounding surface the second mould section is in contact with a base, and a movable punch being situated inside the second mould section, which injection-moulding apparatus further comprises means for moving the punch. Such an apparatus is used inter alia for the manufacture of optical information carriers such as, for example, Compact Discs. These are round discs having a center hole. This hole is formed by the punch.

BACKGROUND OF THE INVENTION

An injection-moulding apparatus of the type defined in the opening sentence is known from U.S. Pat. No. 4,185,955. The second mould section of said apparatus comprises the means for moving the punch. These means comprise a pneumatic cylinder in which piston is arranged to reciprocate a plate to which the punch has been secured. This cylinder is connected to a pneumatic control system via lines. If by means of this injection-moulding apparatus a product is to be manufactured which differs from the previously manufactured product the second mould section must be converted. For this purpose the mould section has to be removed from the injection-moulding apparatus in view of the space necessary for conversion. With the prior-art injection-moulding apparatus this is laborious and time-consuming because it is also necessary to disconnect pneumatic supply and discharge lines and because auxiliary devices, for example a hoist, have to be used since the mould section is heavy. This is an expensive operation because production is held up during the conversion. Since manufacturers wish to minimize stocks and wish to offer products in small series, the demand for small batches of a product increases. This leads to an increased conversion time in proportion to the production time, resulting in a rise of the product costs.

SUMMARY OF THE INVENTION

It is an object of the invention to provide an injection-moulding apparatus of the type defined in the opening sentence, enabling the conversion of the mould to be effected more rapidly. For this purpose the injection-moulding apparatus in accordance with the invention is characterized in that the base has been provided with the means, situated externally of the mould, for moving the punch. This reduces the size and weight of the second mould section to be converted, so that no auxiliary devices are needed for the removal of the mould section from the injection-moulding apparatus. Moreover, time is saved because the number of lines to be disconnected is reduced.

An embodiment of the injection-moulding apparatus in accordance with the invention is characterized in that inside the second mould section there has also been provided an ejector for ejecting a sprue from the punch and the injection-moulding apparatus comprises further means for moving the ejector, the base having been provided with the further means, situated externally of the mould, for moving the ejector. If further moving parts are situated inside the mould, for example an ejector, it is advantageous that the further means for moving said further moving parts are also situated outside the mould in the base.

A further embodiment of the injection-moulding apparatus in accordance with the invention is characterized in that at the location of the bounding surface the punch and the ejector have each been divided into a first part situated in the second mould section and a second part situated in the base. Both parts of the punch and of the ejector are in contact with one another but are not connected to one another. This reduces the number of connections to be detached for removing the mould section. Since the punch and the ejector are divided at the location of the bounding surface the mould section can be removed from the injection-moulding apparatus by moving the mould section only in the plane of the bounding surface. It is not necessary to move the mould section also in a direction perpendicular to the bounding surface. This is advantageous in view of the time required for removing and replacing the mould section.

An advantageous embodiment of the injection-moulding apparatus in accordance with the invention is characterized in that the means for moving the punch comprise a movable piston situated in a cylindrical recess provided in the base. A further advantageous embodiment of the injection-moulding apparatus is characterized in that the further means for moving the ejector comprise a movable further piston situated in a further cylindrical recess provided in the piston for the purpose of moving the punch.

The invention further relates to a mould adapted for use in an injection-moulding apparatus in accordance with the invention.

BRIEF DESCRIPTION OF THE DRAWINGS

The invention will now be described in more detail, by way of example, with reference to the drawings. In the drawings.

DETAILED DESCRIPTION OF THE PREFERRED EMBODIMENTS

Figure 1:
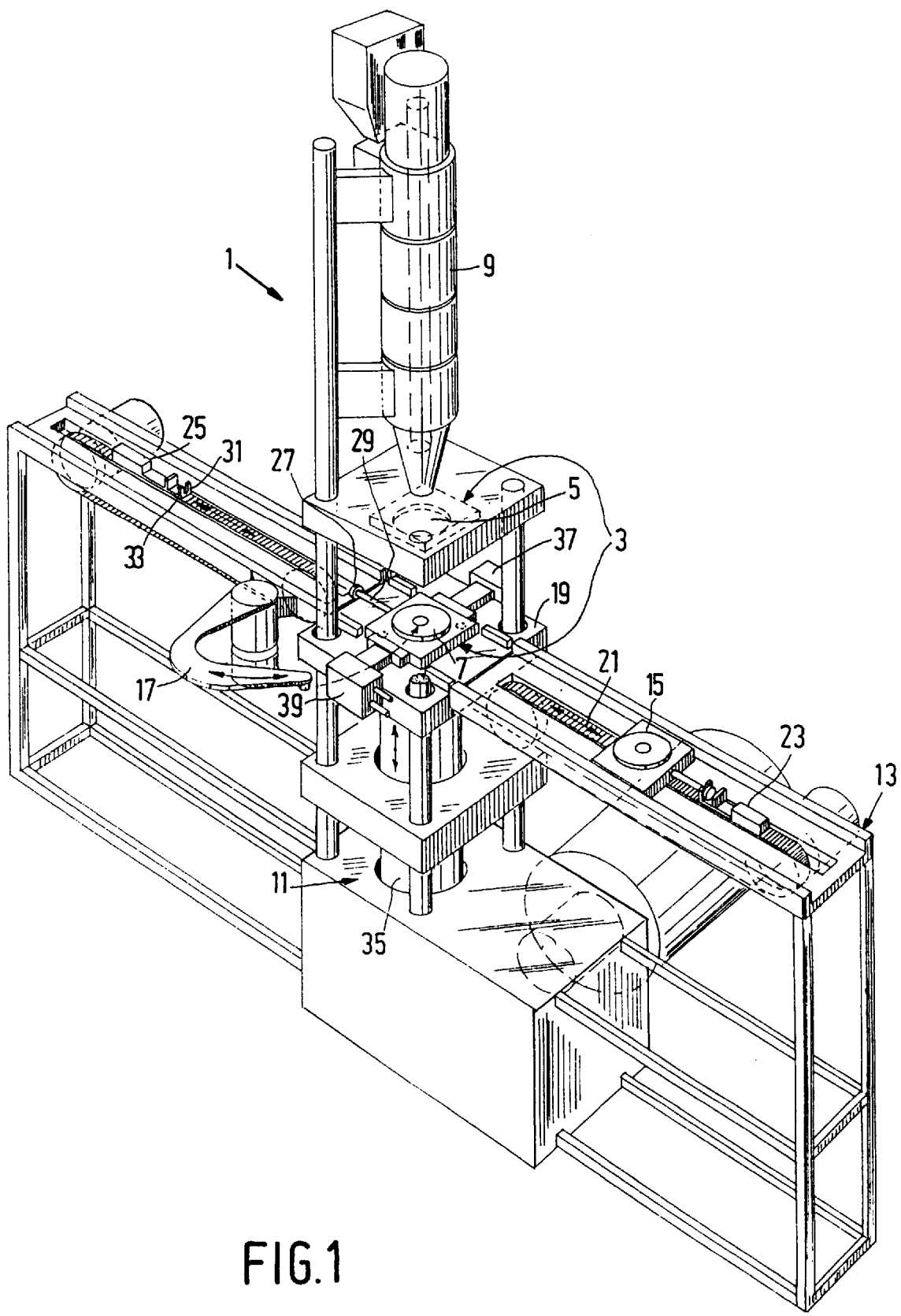
FIG. 1 shows an injection-moulding apparatus in accordance with the invention.

FIG. 1 shows an injection-moulding apparatus 1 comprising a mould 3 having a first and a second mould section 5, 7 which are movable relative to one another, an injection-moulding unit 9 for feeding a molten synthetic material under pressure into the mould, a displacement unit 11 for moving the second mould section 7, and a transport device 13 for exchanging the second mould section 7 with a further mould section 15. The first and the second mould section 5, 7 are movable between a position in which the two mould sections are spaced apart (see FIG. 1) and a position in which the two mould sections are in contact with one another, the two sections defining a disc-shaped cavity in which an information carrier, for example a Compact Disc, can be formed (see FIG. 2). The injection-moulding apparatus 1 further comprises a movable arm 17 for removing the moulded information carrier from the second mould section 7 when the two mould sections are spaced apart. To enable the second mould section 7 to be rapidly exchanged with the further mould section 15 the number of connections with a base 19 of the displacement unit 11, which carries the second mould section, should be as small as possible. The transport device 13 comprises a conveyor belt 21 carrying a plurality of coupling members 23, 25 which can be coupled to the second mould section 7 and the further mould section 15. This is effected by moving a coupling member 25 towards the second mould section 7 and lowering the second mould section, a disc 27, which is secured to the second mould section 7 by a rod 29, engaging behind two teeth 31, 33 of the coupling member 25. For this purpose the base 19 is arranged on a movable cylinder 35 of the displacement unit 11. Subsequently, the second mould section 7 is detached from the base 19 by loosening clamping units 37, 39. The conveyor belt 21 can now be driven to move the second mould section 7 away from the base 19 and at the same time position the further mould section 15 above the base 19.

Figure 2:
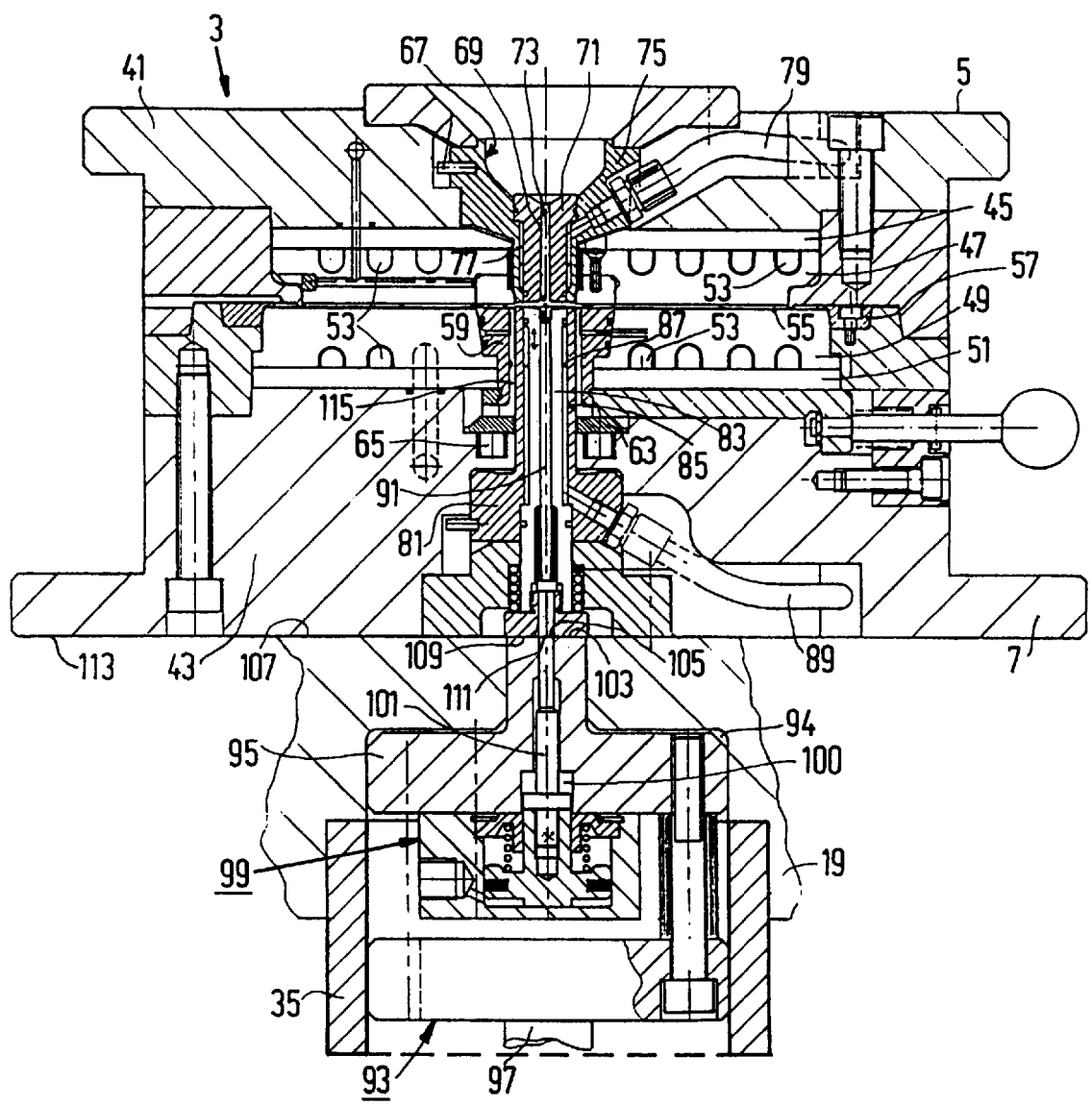
FIG. 2 is a sectional view of the mould sections and of a part of the base.

FIG. 2 shows the first and the second mould section 5, 7 and a part of the base 19. The mould sections each have a rear part 41, 43 on which two interconnected plates 45, 47, 49, 51 are arranged. One of the plates has grooves 53, which after interconnection of the two plates form cooling ducts for cooling the moulded information carrier. The plates are interconnected by soldering. In comparison with the customary bolting method, using O-rings for sealing the cooling ducts, soldering has the advantage that it also provides sealing of the cooling ducts and that the plates to be interconnected can be thinner because no material for screwthread has to be provided. The plate 49 of the second mould section 7 carries a shell 55, which is clamped in position by means of a clamping ring 57 and a clamping bush 59. This shell 55 has a profile representing information. This profile is formed in the product during moulding of a product. The plate 47 of the first mould section 5 facing the shell has a smooth surface because the product is provided with information at one side only. The clamping bush 59 is held in position by a slide 61 and can be removed from the second mould section 7 by pulling the slide 61 outward. This results in a dish 63, which is held in position against the load of a spring 65, being urged against the clamping bush 59 by the spring 65, so that the clamping bush is pushed out of the mould 3.

The first mould section 5 has a sprue bush 67 in which an injection duct 69 is formed. This sprue bush 67 comprises a cylinder 71 with a central bore 73. This cylinder is situated in a cylindrical hole in a housing 75 of the sprue bush 67 and has been soldered to the housing near its ends. A space 77 between the housing and the cylinder forms a cooling duct and is connected to a cooling system via a line 79. A movable punch 81 is arranged opposite the sprue bush 67 in the second mould section 7 to sever a sprue comprising a sprue slug and a stalk portion from the product, which sprue slug and stalk portion are situated between the punch 81 and the sprue bush 67 after the product has been formed. The punch 81 is formed by a cylinder 83 which near its ends has been soldered to a bush 85, a space 87 being present between the cylinder and the bush to form a cooling duct, which is connected to a cooling system via a line 89. The cylinder 83 has a central bore in which an ejector 91 is situated for ejecting the sprue slug with the stalk portion from the punch 81. When the sprue slug and the stalk portion are severed the sprue bush 67, which faces the punch 81, is not moved but the stalk portion is compressed between the sprue bush and the punch 81. This is possible because the distance over which the punch is moved, which distance is at least equal to the thickness of the connection between the stalk portion and the product, is substantially smaller than the thickness of the stalk portion.

The base 19 of the injection-moulding apparatus 1, which carries the second mould section 7, comprises means 93 for moving the punch 81. These means 93 comprise a piston 95 which is movable in a cylindrical recess 94 formed in the base. The piston 95 can be moved by means of a rod 97. This rod 97 is situated in the hollow cylinder 35. The punching movement performed by the means 93 is followed by the punch 81 present in the second mould section 7, thus enabling a sprue slug to be severed from an information carrier. The base 19 comprises further means 99 for performing an ejection movement. These further means 99 comprise a further piston 101, which is hydraulically or pneumatically movable. This further piston 101 is situated in a further cylindrical recess 100 formed in the first-mentioned piston 95. Both pistons have an end face 103, 105 coinciding with a mounting surface 107 of the base 19 on which the second mould section 7 is disposed. The punch 81 and the ejector 91 also have end faces 109, 111 which coincide with a bounding surface 113 of the second mould section 7 and which are in contact with the end faces 103, 105 of the pistons 95, 101 of the base 19. Both the punch movement and the ejection movement are performed against spring force. The spring force provides the return movement of the punch and the ejector in the absence of the liquid or gas pressure.

Thus, the exchangeable second mould section 7 does not comprise any mechanisms for moving the punch and the ejector. These mechanisms 93, 99 are arranged in the base 19 and can be coupled simply to the punch 81 and the ejector 91 of the mould 3. Moreover, no mechanism has been provided for extracting the moulded information carrier from the second mould section 7 because this is effected exclusively by means of compressed air. In the known injection-moulding apparatus this is effected by lifting the information carrier from the shell by means of an ejection cylinder near the centre of the information carrier and at the same time blowing air between the information carrier and the shell via an air duct. The injection-moulding apparatus in accordance with the invention is constructed in such a manner that it suffices to blow air between the information carrier and the shell 55. This is effected via an air duct 115 formed between the clamping bush 59 and the punch 81. With the present construction the information carrier can be demoulded by means of compressed air because the distance over which the information carrier is to be moved to allow it to be gripped by the arm 17 is substantially smaller than with the prior-art moulds. This is possible because the clamping ring 57, which clamps the shell 55 onto the second mould section 7, only projects from the shell 55 over a distance equal to the thickness of the information carrier. The steps mentioned hereinbefore yield a simple mould section which can be exchanged rapidly with another mould section.

Although the invention has been described with reference to the drawings this does not imply that the invention is limited to the embodiment shown in the drawings. The invention likewise relates to all embodiments which deviate from those shown in the drawings within the scope defined by the Claims.

What is claimed is:

1. An injection-moulding apparatus in which a mould section thereof is removable and rapidly exchangeable with a further mould section, said apparatus comprising a mould having a first and a second mould section, which mould sections are movable relative to one another between a first position, in which both mould sections are in contact with one another and define a cavity for moulding a product, and a second position, in which the mould sections are spaced apart to allow removal of the moulded product, a displacement unit carrying a base, which displacement unit functions to move the second mould section, a transport device for exchanging the second mold section carried by the base with a further mould section, and a movable punch and an ejector for removing a sprue from the punch situated inside the second mould section, the second mould section having a bounding surface at a side remote from the first mould section, with which bounding surface the second mould section is in contact with the base, wherein the base is provided with means for moving the punch and with further means for moving the ejector, the second mould section being detachable from the base by movement thereof at least in the plane of the bounding surface, and exchangeable with said further mould device carried by said transport device, the transport device being effective to move the second mould section away from the base and to position the further mould section on the base.

2. An injection-moulding apparatus as claimed in claim 1 wherein the means for moving the punch comprise at least one movable piston situated in a cylindrical recess provided in the base.

3. An injection-moulding apparatus as claimed in claim 1, wherein the further means for moving the ejector comprise a movable further piston situated in a further cylindrical recess provided in the piston.

4. An injection-moulding apparatus in which a mould section thereof is removable and rapidly exchangeable with a further mould section at an improved rate, said apparatus comprising a mould having a first and a second mould section, which mould sections are movable relative to one another between a first position, in which both mould sections are in contact with one another and define a cavity for moulding a product, and a second position, in which the mould sections are spaced apart to allow removal of the moulded product, a displacement unit carrying a base, which displacement unit functions to move the second mould section, a transport device for exchanging the second mold section carried by the base with a further mould section, and a movable punch and an ejector for removing a sprue from the punch situated inside the second mould section, a second mould section having a bounding surface at a side remote from the first mould section, with which bounding surface the second mould section is in contact with a base, wherein the base is provided with means for moving the punch and with further means for moving the ejector, the means for moving the punch and the further means for moving the ejector being provided on the base and being situated externally of the mould, wherein at the location of the bounding surface the punch and the ejector have each been divided into a first part situated in the second mould section and a second part situated in the base, the second mould section being detachable from the base by movement thereof at least in the plane of the bounding surface and exchangeable with said further mould device carried by said transport device, the transport device being effective to move the second mould section away from the base and to position the further mould section on the base.

5. An injection-moulding apparatus as claimed in claim 4 wherein the means for moving the punch comprise a movable piston situated in a cylindrical recess provided in the base.

6. An injection-moulding apparatus as claimed in claim 4, wherein the second mould section is an exchangeable mould section devoid of a mechanism for moving the punch and ejector.

* * * * *